United States Patent [19]

Hautau

[11] 4,024,963
[45] May 24, 1977

[54] APPARATUS FOR TRANSFERRING ARTICLES

[76] Inventor: Charles F. Hautau, 146 Hilltop Road, Oxford, Ohio 45056

[22] Filed: May 7, 1975

[21] Appl. No.: 575,256

[52] U.S. Cl. .......................... 214/6 BA; 214/1 BT; 214/1 BH; 214/8.5 D; 271/18.1

[51] Int. Cl.$^2$ ......................................... B65G 60/00

[58] Field of Search .......... 214/8.5 R, 8.5 A, 8.5 D, 214/8.5 SS, 1 B, 1 BB, 1 BC, 1 BS, 1 BT, 1 BH, 6 BA, 6 G; 271/18.1

[56] References Cited

UNITED STATES PATENTS

| | | | |
|---|---|---|---|
| 2,650,092 | 8/1953 | Wall | 271/18.1 |
| 2,974,811 | 3/1961 | Dammert et al. | 214/1 BC |
| 3,221,910 | 12/1965 | Izumi | 214/1 BH X |
| 3,310,183 | 3/1967 | Paquette | 214/6 BA |
| 3,512,660 | 5/1970 | Bende | 214/8.5 D |
| 3,780,884 | 12/1973 | Jones | 214/8.5 D |
| 3,822,024 | 7/1974 | Endter et al. | 214/8.5 D |

Primary Examiner—Frank E. Werner
Attorney, Agent, or Firm—Jacox & Meckstroth

[57] ABSTRACT

A rotary transfer member carries means for picking up a sheet-like article from the top of a supply stack supported within a hopper having an open top and an open bottom. An indexing mechanism includes means for intermittently rotating an output shaft in response to a continuously driven input shaft, and the transfer member is supported for rotation with the output shaft and also for axial movement relative to the output shaft. The transfer member is moved axially in response to linear movement of a follower which engages a cam connected for continuous rotation with the input shaft. Supply stacks of articles are successively elevated into the hopper from an index table by a power driven jack mechanism, and a set of magnets are positioned adjacent the hopper for magnetically spreading and spacing the articles within the upper portion of the supply stack within the hopper.

4 Claims, 5 Drawing Figures

APPARATUS FOR TRANSFERRING ARTICLES

BACKGROUND OF THE INVENTION

In the feeding or supply of metal sheet-like articles or blanks to a machine or press where one or more operations are performed on each article, it is commonly desirable to supply or transfe the articles to the press in a successive manner and at a high rate of speed so that optimum performance can be obtained from the press. It is also desirable for the feeding or transfer mechanism to operate in a continuous and dependable manner without interruption so that there is no down time of the press which receives the articles.

Frequently, it is necessary to supply or feed sheet-like articles such as flat blanks to a press by picking up each sheet from the top of a supply stack, moving the sheet laterally or horizontally to a predetermined location and then lowering the sheet onto a feeding mechanism which successively feeds the blanks or sheets into the press. Furthermore, it is usually desirable for the articles or sheets to be transferred from the supply stack to the press in precise timed relation with the operation of the press.

SUMMARY OF THE INVENTION

The present invention is directed to improved apparatus for successively transferring articles from a storage or supply station to another station where the article receives one or more operations. Apparatus of the invention is particularly adapted for successively transferring articles at a high speed and in timed sequence with another power driven machine and is also adapted for dependable operation so that the articles are transferred without skipping or interruption. In addition, the apparatus of the invention provides for precision movement of each article along a predetermined path and for precisely positioning the article at a receiving station.

Other advantages and features of the invention and the specific construction of one embodiment will be apparent from the following description, the accompanying drawing and the appended claims.

DESCRIPTION OF THE PREFERRED EMBODIMENT

Figure 1:
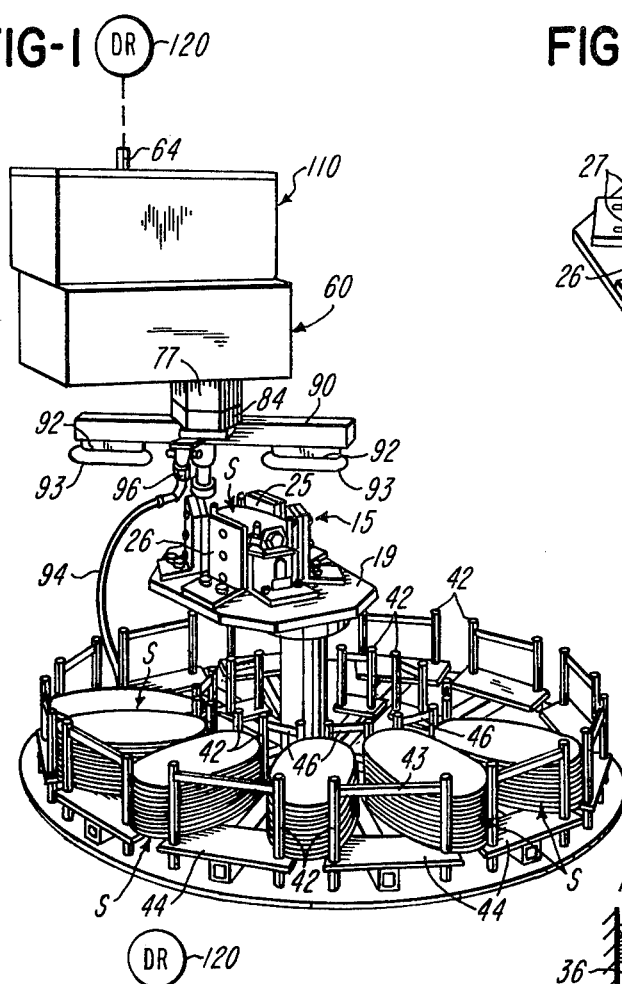
FIG. 1 is a perspective view of apparatus constructed in accordance with the invention for successively transferring articles from supply stacks to a receiving station.

The apparatus illustrated in FIG. 1 is adapted for successively transferring articles A in the form of flat oval metal blanks or sheets from a supply stack S to a mechanism (not shown) for feeding a press having a die set for forming each sheet into an end wall of a muffler. However, while each article A is illustrated in the form of a flat oval blank or sheet, it is to be understood that the article may be of a different shape or configuration.

Figure 2:
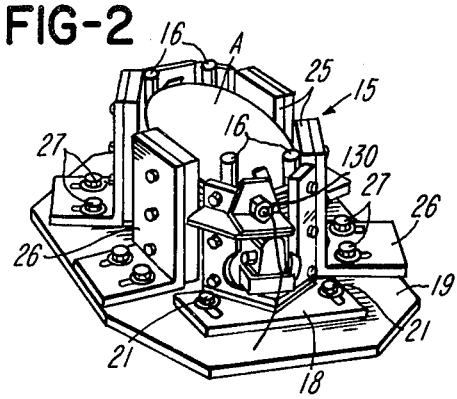
FIG. 2 is an enlarged perspective view of the hopper forming part of the apparatus shown in FIG. 1.
Figure 3:
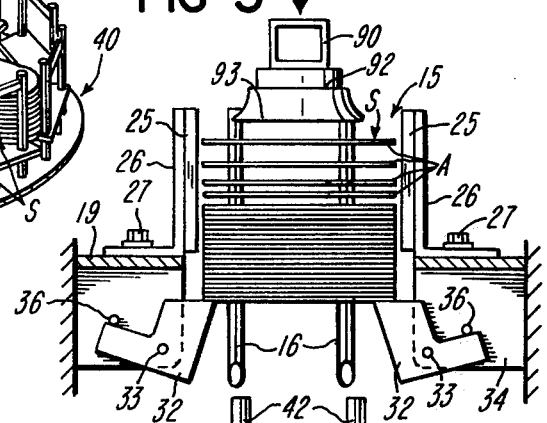
FIG. 3 is a diagramatic vertical section of the lower portion of the apparatus shown in FIG. 1.

As shown in FIGS. 2 and 3, the stack S of flat ferrous metal sheets A are confined within a hopper 15 formed by two sets or pairs of vertical guide rods 16 positioned at opposite ends of the stack. Each pair of guide rods 16 is supported by an L-shaped bracket 18 which is mounted on a horizontal support plate or platform 19 for lateral or horizontal adjustment by a set of screws 21 extending through corresponding slots within the base portion of the bracket. A set of four rectangular permanent magnets 25 are supported in horizontally spaced generally opposing relation on opposite sides of the stack S by corresponding L-shaped brackets 26 which are also secured to the platform 19 by sets of screws 27 extending through corresponding slots within the base of the brackets 26.

Preferably, the magnets 25 are of the type manufactured and marketed by Bunting Magnetics Co., Franklin Park, Ill. and are effective to induce a magnetic field within the sheets A so that the sheets within the upper portion of the stack are separated and spaced vertically apart in a logarithmic manner and the sheets remain in parallel vertically spaced relation. This magnetic separation of the sheets within the upper portion of the stack assures that two adjacent sheets do not stick together as a result of oil or other forms of surface adhesion.

A set of four dogs or pawls 32 are positioned adjacent the bottom of the hopper 15, and each pawl 32 is pivotally supported by a corresponding horizontal pin 33 secured by a bracket 34 depending from the stationary platform 19. The pivot pins 33 are located so that the weight of each pawl 32 normally positions the pawl as shown in FIG. 3 where the pawl engages the bottom article or sheet A within the stack S and rests against a corresponding stop pin 36.

A rotary indexing transport member or table 40 is positioned below the hopper 15 and includes sets of upwardly projecting rods 42 which are interconnected by cross-members 43, 44 and 46 to form nests for receiving a plurality of supply stacks S of sheets A. The stacks S are angularly arranged in a spoke-like manner on the annular table 40, and are successively located or positioned directly under the hopper 15 in response to indexing of the table 40 by a suitable power indexing drive (not shown).

A mechanical elevator or jack actuator 50 (FIG. 3) is positioned below the transport table 40 and under the hopper 15, and includes a circular head member 52 secured to the upper end of a helical ball screw 53 which receives recirculating balls (not shown) confined within a rotary nut driven by a reversible drive motor 55. Preferably, the jack actuator 50 is of the ball screw actuator type, for example, as manufactured and marketed by Duff-Norton Company, Charlotts, N.C. A set of circular holes 56 are formed within the indexing table 40 directly under the centers of the stacks S of sheets A, and each hole 56 is adapted to receive the head 52 of the jack actuator 50 when the head member 52 is raised for elevating a stack of articles on the table 40 into the hopper 15.

Figure 4:
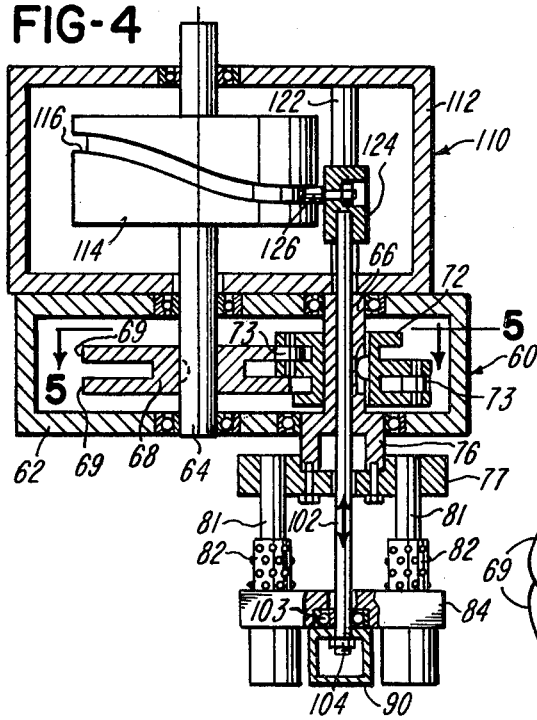
FIG. 4 is a diagramatic vertical section of the upper portion of the apparatus shown in FIG. 1.
Figure 5:
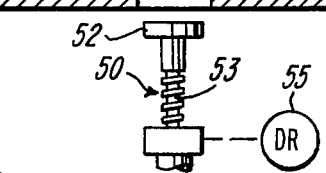
FIG. 5 is a fragmentary section taken generally on a line 5—5 of FIG. 4 and showning the indexing mechanism used in the apparatus.

Referring to FIGS. 1 and 4, a rotary indexing unit or mechanism 60 includes a housing 62 which is mounted on a frame (not shown) and supports a rotatable input shaft 64 and a rotatable tubular output shaft 66. Preferably, the general construction of the indexing unit or mechanism 60 is similar to that shown in U.S. Pat. No.

2,986,949 which issued to Commercial Cam and Machine Company, Chicago, Ill. The indexing mechanism 60 provides for indexing the output shaft 66 in angles of predetermined degrees in response to continuous rotation of the input shaft 64. A double cam member 68 is secured to the input shaft 64 for rotation therewith and has outer peripheral cam surfaces 69. A cam follower 72 includes a plurality of axially spaced sets of roller 63 for engaging the outer cam surfaces 69 of the cam members 68. THe cam member 68 and the cam follower member 72 cooperate to prevent back lash or relative play when the follower member 72 is rotatably indexed in response to continuous rotation of the cam mmember 68 and thus provides for precision rotation of the output shaft 66.

The output shaft 66 includes an enlarged cylindrical lower portion 76 which supports an elongated upper plate 77. A pair of parallel spaced vertical guide rods 81 have their upper end portions rigidly secured to the plate 77 and project downwardly into corresponding antifriction sleeve-type ball bearings 82 which are supported by an elongated lower plate 84. Thus the plates 77 and 84 rotate with the output shaft 66 of the indexing mechanism 60, and the lower plate 84 is supported for vertical movement relative to the upper plate 77. Preferably, the plates 77 and 84 are constructed of aluminum to minimize their mass.

An elongated transfer member or arm 90 has its center portion rigidly secured to the lower plate 84, and a pair of oval shaped suction units 92 (FIG. 1), having resilient oval lips 93, are secured to the opposite end portions of the transfer arm 90. Compressed air is supplied to the transfer arm 90 through an air supply tube 94 (FIG. 1) and a rotary union 96 located on the axis of rotation, and the compressed air is passed through a venturi to generate a suction within each suction unit 92 when it is positioned over the hopper 15. The pressurized air supply is also alternately supplied directly to each suction unit 92 when it is positioned 180° from the hopper 15, as will be explained later.

Referring to FIG. 4, an elongated vertical rod 102 extends through the tubular output shaft 66 of the indexing mechanism 60 and has its lower end portion connected to the lower plate 84 through an anti-friction thrust bearing 103 and a nut 104. A linear actuating unit or mechanism 110 includes a box-like housing 112 which is secured to the housing 62 of the indexing mechanism 60 and encloses a cylindrical barrel-type cam member 114 which has a peripherally extending cam groove or surface 116. The cam member 114 is rigidly secured or connected to the input shaft 64 of the indexing mechanism 60 and is driven with the cam member 68 at a constant rpm by a drive unit 120.

The housing 112 of the linear actuating mechanism 110 also supports a pair of horizontally spaced vertical guide rods 122 which receive a corresponding pair of sleeve-type anti-friction ball bearings (not shown) retained within a follower block 124 rigidly connected to the upper end portion of the actuating rod 102. The block 124 supports a roller-type cam follower member or element 126 which projects horizontally into the cam groove 116 of the cam member 114.

In operation of the article transfer apparatus described above, the input shaft 64 is driven at a constant speed by the drive 120 which may be an extension from the drive of another machine such as a punch press. The cam members 68 and 114 are designed so that the output shaft 66 is indexed in increments of 180° with a dwell between each indexing movement. The cam member 114 produces vertically reciprocating movement of the plate 84 and the transfer arm 90 during each dwell of the indexing mechanism 60. When the transfer arm 90 descends, the suction unit 92 overlying the hopper 15 is effective to pick up the uppermost blank or sheet A on the stack S within the hopper 15. After the transfer arm 90 ascends to the position where the lower plte 84 is substantially adjacent the upper plate 77, the transfer arm is rotated or indexed 180° by the mechanism 60 so that the blank or sheet A is carried to a receiving station, for example, above a feed mechanism (not shown) which successively feeds the sheets into a punch press.

When the transfer arm 90 again descends, air pressure is created within the suction unit 92 at the receiving station so that the transferred sheet A is released from the suction unit and deposited on the sheet feeding mechanism. Simultaneously, the suction unit 92 on the opposite end of the transfer arm 90 picks up the uppermost sheet A within the stack S within the hopper 15 as a result of a suction created in the suction unit, and the cycle is repeated. As mentioned above, successive stacks of blanks or sheets A are supplied to the hopper 15 in response to a proximity sensor 130 which sense the level of the sheets A within the hopper 15 and controls the operation of the indexing drive for the table 40 and the drive 55 for operating the jack actuator 50.

From the drawings and the above description, it is apparent that transfer apparatus constructed in accordance with the present invention, provides desirable features and advantages. For example, the combination of the rotary indexing unit or mechanism 60 and the linear actuating unit or mechanism 110 provides for a precision high speed transfer of a succession of articles when it is desirable to transfer each article along a path which requires vertical or "X" movement as well as horizontal or "Y" movement. Furthermore, the combined mechanisms produce the X—Y transfer path at a high speed in response to continuous rotation of the input shaft 64. For example, it has been found that the combined mechanisms provide for easily transferring metal blanks or sheets A at a speed of one sheet per second and for depositing each sheet in a precise position at the receiving station. In addition, the two separate cam members 68 and 114 provide for conveniently and independently selecting or changing the "X" path and the "Y" path to produce a desired transfer path. It is also understood that the rotary indexing mechanism 60 may be constructed to produce intermittent rotary oscillatory movement as well as intermittent rotary indexing movement.

As another important advantage, the mechanisms 60 and 110 cooperate with the article supply hopper 15 and article spacing magnets 25 to assure that the articles or sheets are successively transferred in a rapid manner without interruptions and with optimum dependability so that continuous operation of the press which receives the articles is assured.

While the indexing mechanism 60 and the linear actuating mechanism 110 are illustrated in a machine for successively transferring flat sheets A from the supply hopper 15, it is apparent that the combined mechanisms may be used in other machines or apparatus which require X—Y transferring or advancement of one or more articles. Furthermore, while the form of transfer apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for transferring articles, comprising means for supporting a stack of articles, means for continuously supplying articles to the bottom of the stack, a transfer mechanism including a rotary input shaft and a rotary output shaft, first cam actuated means for intermittently indexing said output shaft in one direction in response to continuous rotation of said input shaft in one direction, a transfer arm including means for engaging each article on the top of the stack, means connected to said output shaft and supporting said transfer arm for indexing with said output shaft and for axial movement relative to said output shaft, second cam actuated means driven by said input shaft for producing reciprocating axial movement of said transfer arm in response to said rotation of said input shaft for moving said article engaging means to pick up and article on the top of the stack, and said first cam actuated means cooperate with said second cam actuated means to produce synchronized compound rotary indexing and axial movement of said transfer arm and said article engaging means in response to continuous rotation of said input shaft for successively transferring articles from the stack.

2. Apparatus for transferring articles, comprising means forming a hopper for receiving a stack of articles, said hopper having an open top and an open bottom, means for elevating a supply of articles upwardly through said bottom of said hopper to provide for continuously supplying articles to the stack, a transfer mechanism including a rotary input shaft and a rotary output shaft having parallel spaced generally vertical axes, first cam actuated means for intermittently indexing said output shaft in one direction in response to continuous rotation of said input shaft in one direction, a transfer arm including means for engaging each article on the top of the stack, means depending from said output shaft and supporting said transfer arm for indexing with said output shaft and for axial movement in a generally vertical direction relative to said output shaft, second cam actuated means driven by said input shaft for producing reciprocating generally vertical axial movement of said transfer arm in response to said rotation of said input shaft for moving said article engaging means to pick up an article on the top of said stack, and said first cam actuated means cooperate with said second cam actuated means to produce synchronized compound rotary indexing and axial movement of said transfer arm and said article engaging means in response to continuous rotation of said input shaft for successively transferring articles from the top of said hopper.

3. Apparatus as defined in claim 2 including a plurality of magnets positioned in generally opposed relation on opposite sides of the stack of articles, said magnets including means for magnetically positioning the articles within the upper portion of the stack in vertically spaced relation to assure separation of adjacent articles and successive pickup of each article by said article engaging means, a plurality of pawls supported for movement adjacent the lower portion of said hopper for supporting the stack of articles within said hopper, said pawls being movable in response to engagement of the articles being elevated upwardly through the bottom of said hopper, transport means for supplying successive stacks of articles to a position located directly below said hopper, and power operated means disposed below said transport means and including a vertically movable member for elevating each stack of articles upwardly into said hopper.

4. Apparatus as defined in claim 2 wherein said output shaft is tubular, a rod member extending axially through said output shaft and having a lower portion connected to said transfer arm, a generally cylindrical cam member connected to rotate with said input shaft and having a peripheral cam surface, a cam follower connected to said rod member and engaging said cam surface, and means supporting said cam follower for generally vertical axial movement.

* * * * *